United States Patent
Chen et al.

(10) Patent No.: US 10,490,230 B2
(45) Date of Patent: Nov. 26, 2019

(54) OPTICAL DISK DRIVE AND LOCKING MODULE

(71) Applicant: Wistron Corporation, New Taipei (TW)

(72) Inventors: Jhih-Ming Chen, New Taipei (TW); Meng-Chian Shiu, New Taipei (TW); Chi-Jen Lo, New Taipei (TW)

(73) Assignee: Wistron Corporation, New Taipei (TW)

( * ) Notice: Subject to any disclaimer, the term of this patent is extended or adjusted under 35 U.S.C. 154(b) by 0 days.

(21) Appl. No.: 15/644,833

(22) Filed: Jul. 10, 2017

(65) Prior Publication Data

US 2018/0261258 A1 Sep. 13, 2018

(30) Foreign Application Priority Data

Mar. 8, 2017 (TW) .............................. 106107476 A

(51) Int. Cl.
*G11B 33/12* (2006.01)
*G11B 33/00* (2006.01)
*G06F 1/18* (2006.01)

(52) U.S. Cl.
CPC ............ *G11B 33/124* (2013.01); *G06F 1/187* (2013.01); *G11B 33/00* (2013.01); *G06F 2212/2112* (2013.01)

(58) Field of Classification Search
CPC ....... G11B 33/124; G11B 33/00; G06F 1/187; G06F 2212/2112
USPC .................................. 361/609, 727, 731, 732
See application file for complete search history.

(56) References Cited

U.S. PATENT DOCUMENTS

| | | | | |
|---|---|---|---|---|
| 6,952,341 | B2 * | 10/2005 | Hidaka | G11B 33/022 312/332.1 |
| 7,040,908 | B2 * | 5/2006 | Kamata | H01R 13/6335 439/159 |
| 7,080,995 | B2 * | 7/2006 | Cheng | G06K 13/08 439/138 |
| 7,123,487 | B2 * | 10/2006 | Saito | G06K 7/0013 361/801 |
| 7,355,846 | B1 * | 4/2008 | Chen | G06F 1/187 248/618 |
| 7,445,477 | B2 * | 11/2008 | Ting | H01R 12/7011 439/159 |

(Continued)

FOREIGN PATENT DOCUMENTS

| | | |
|---|---|---|
| CN | 102238839 | 11/2011 |
| TW | I413116 | 10/2013 |

OTHER PUBLICATIONS

"Office Action of Taiwan Counterpart Application," with partial English translation thereof, dated Sep. 14, 2017, p. 1-p. 12.

*Primary Examiner* — Anatoly Vortman
(74) *Attorney, Agent, or Firm* — JCIPRNET

(57) ABSTRACT

An optical disk drive (ODD) including a shell and a locking module is provided. The shell includes a main body portion and a side portion, and the side portion is connected to the main body portion. A concave space is formed between a side surface of the main body portion and a top surface of the side portion. The locking module is disposed inside the concave space. The ODD is detachably held in a support frame of an electronic device through the locking module. In addition, a locking module is also provided.

27 Claims, 7 Drawing Sheets

(56) References Cited

U.S. PATENT DOCUMENTS

| | | | |
|---|---|---|---|
| 8,391,004 B2* | 3/2013 | Watanabe | G11B 33/123 361/679.38 |
| 8,570,733 B2* | 10/2013 | Long | G06F 1/187 211/26 |
| 8,804,325 B2* | 8/2014 | Fu | G11B 33/124 211/26 |
| 2006/0126288 A1* | 6/2006 | Chen | G06F 1/184 361/679.33 |
| 2006/0133030 A1* | 6/2006 | Takahashi | G06F 1/184 361/679.36 |
| 2006/0139871 A1* | 6/2006 | Chen | G06F 1/184 361/679.39 |
| 2007/0019379 A1* | 1/2007 | Hsiao | G06F 1/184 361/679.02 |
| 2007/0211422 A1* | 9/2007 | Liu | G06F 1/187 361/679.37 |
| 2008/0112126 A1* | 5/2008 | Hsu | G11B 33/124 361/679.38 |
| 2008/0132120 A1* | 6/2008 | Tsai | G06K 7/0021 439/630 |
| 2011/0032670 A1* | 2/2011 | Tsai | G06F 1/187 361/679.31 |
| 2011/0141669 A1* | 6/2011 | Tsai | E05C 3/048 361/679.01 |
| 2011/0267746 A1 | 11/2011 | Watanabe et al. | |
| 2013/0105422 A1* | 5/2013 | Zhou | G06F 1/187 211/26 |

* cited by examiner

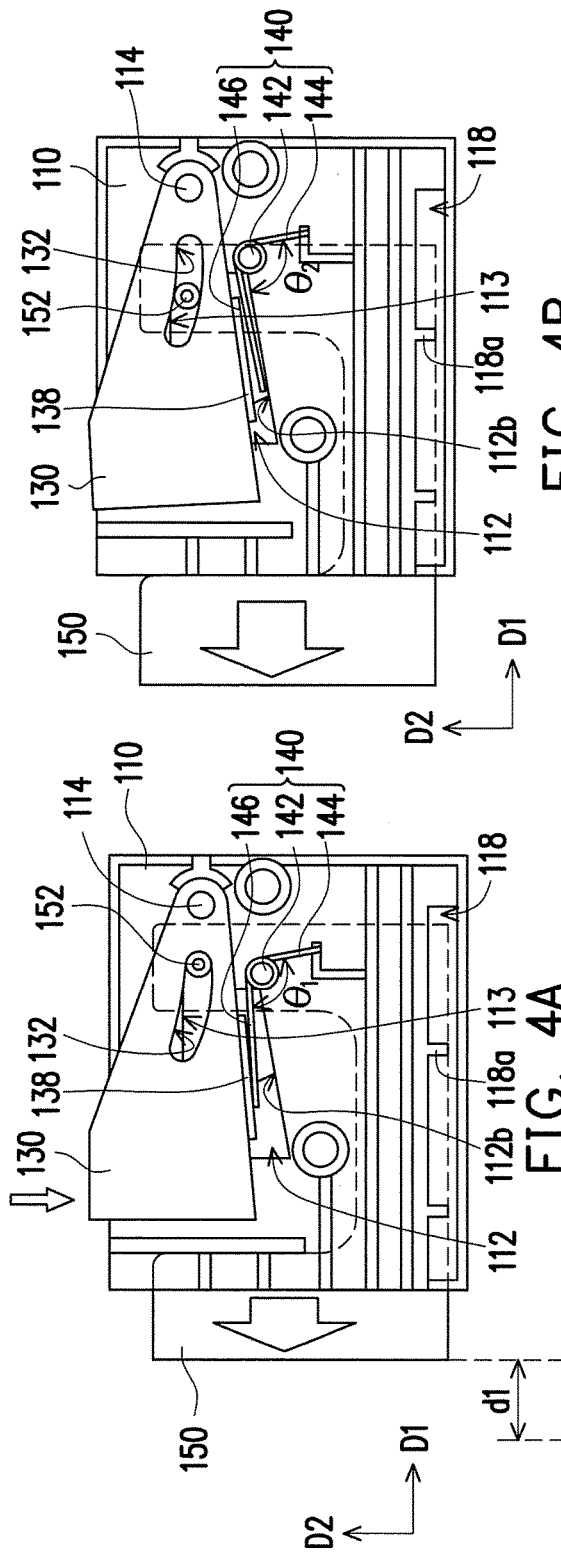
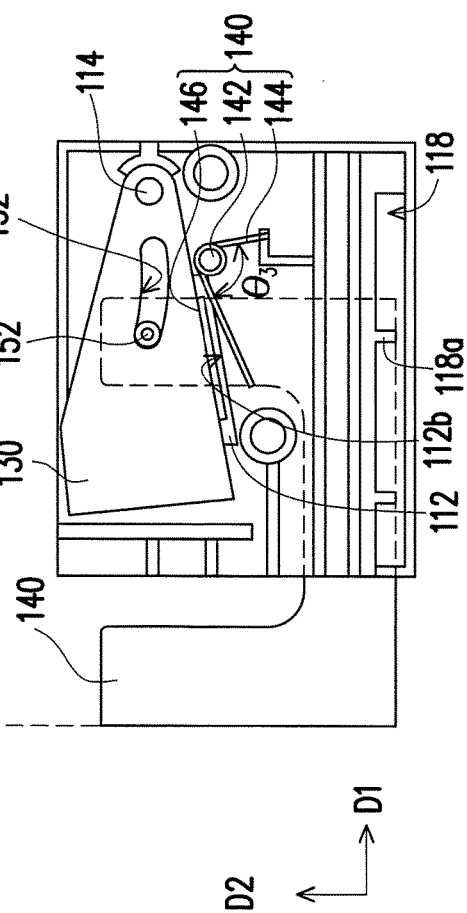
FIG. 4A
FIG. 4B
FIG. 4C

OPTICAL DISK DRIVE AND LOCKING MODULE

CROSS-REFERENCE TO RELATED APPLICATION

This application claims the priority benefit of Taiwan application serial no. 106107476, filed on Mar. 8, 2017. The entirety of the above-mentioned patent application is hereby incorporated by reference herein and made a part of this specification.

BACKGROUND OF THE INVENTION

1. Field of the Invention

The invention relates to a locking module. More particularly, the invention relates to a locking module of an electronic device.

2. Description of Related Art

In a current notebook computer, two buttons are added on the shell of an optical disk drive (ODD) for replacement. One of the buttons is used to unlock the buttons, and the other button is used to drive the ODD to be ejected out. Alternatively, a removing button and a locking screw may be disposed on the ODD for ODD replacement as well. The removing button may be locked by the locking screw, and the removing button is used for ejecting the ODD. Nevertheless, no matter how the buttons are disposed, at least one set of button mold has to be manufactured. In addition, due to different appearances of notebook computers and different configurations of the hardware inside the notebook computers, the buttons designed for different ODD may not be interchangeable. As such, costs of mold development and time required for system shell assembly are increased. Moreover, problems such as uneven assembly gaps between the buttons and the shells, unsmooth sliding of the buttons, stuck buttons, and noises may easily occur.

SUMMARY OF THE INVENTION

The invention provides an optical disk drive (ODD) with a locking module disposed inside a concave space of a shell of the ODD.

In an embodiment of the invention, a locking module has a buckling member and a handle part. The locking module may simply release a structural interference between the buckling member and a support frame driven by the handle part and drive a replaceable module to be removed along a removing direction.

In an embodiment of the invention, an ODD includes a shell and a locking module. The shell includes a main body portion and a side portion, and the side portion is connected to the main body portion. A concave space is formed between a side surface of the main body portion and a top surface of the side portion. The locking module is disposed inside the concave space. The ODD is detachably held in a support frame of an electronic device through the locking module.

In an embodiment of the invention, the locking module is adapted to detachably hold a replaceable module in the support frame of the electronic device or remove the replaceable module out of the support frame in a removing direction. The locking module further includes a body, a buckling member, and a handle part. The body is disposed on the replaceable module. The buckling member is pivoted onto the body and may generate a structural interference with the support frame movably. The handle part may be movably coupled onto the buckling member. The handle part is adapted to move along the removing direction and drive the buckling member to pivot relative to the body to release the structural interference between the buckling member and the support frame.

In an embodiment of the invention, a top surface of the locking module is lower than or substantially flush with a top surface of the main body portion.

In an embodiment of the invention, the locking module further includes a first screwing member. The locking module is locked onto the side surface of the main body portion through the first screwing member.

In an embodiment of the invention, the locking module includes a base, a cover, the buckling member, and the handle part. The base is disposed on the top surface of the side portion and has a first perforated slot. The cover is disposed on the base, and the cover has a supporting portion disposed along a first direction. The supporting portion is propped against the side portion and has an opening slot. An opening direction of the opening slot faces towards an inner side of the support frame and is parallel to a second direction, and the second direction is perpendicular to the first direction. The buckling member is disposed between the base and the cover and is pivoted to the base. The buckling member has a second perforated slot and a hooking portion, and the hooking portion is disposed correspondingly to the opening slot, such that the hooking portion penetrates through the opening slot and is movably engaged with the support frame. The handle part may be movably disposed between the cover and the buckling member, and the handle part has a sliding axle coupled into the second perforated slot. The handle part is adapted to move back and forth relative to the base and the cover along the first direction to drive the sliding axle to slide along the second perforated slot and to further drive the buckling member to pivot relative to the base, so as to release the structural interference between the buckling member and the support frame.

In an embodiment of the invention, the locking module further includes an elastic member. The elastic member is pivoted onto the base and propped against a side of the buckling member.

In an embodiment of the invention, the elastic member is a torsional spring and has a spring body and a first end and a second end connected to the spring body. The spring body is pivoted to the base, and the first end is fixed onto the base.

In an embodiment of the invention, the locking module further includes a second screwing member. The cover is locked onto the base through the second screwing member.

In an embodiment of the invention, the support frame has a card slot. The card slot is disposed correspondingly to the opening slot of the supporting portion. An opening direction of the card slot is parallel to the second direction, and the hooking portion is adapted to be engaged into the card slot through the opening slot.

In an embodiment of the invention, the handle part has a removing portion. The removing portion is disposed on a lateral side of the handle part in the second direction.

In an embodiment of the invention, the base has a guiding rail disposed in the first direction, and the handle part has a first protruding portion disposed in the first direction. The first protruding portion is adapted to slide back and forth along the guiding rail.

In an embodiment of the invention, the buckling member has a second protruding portion. The second protruding portion may be movably inserted into the first perforated slot.

In an embodiment of the invention, the first perforated slot has a first slot wall and a second slot wall disposed opposite to each other. The first slot wall and the second slot wall are respectively inclined in the first direction.

In an embodiment of the invention, the second perforated slot is an arch-shaped slot.

In an embodiment of the invention, when the structural interference between the buckling member and the support frame is released, the handle part is adapted to drive the locking module and the replaceable module to move out of the support frame in the removing direction, and the replaceable module includes an ODD.

In an embodiment of the invention, the body includes the base and the cover. The base is disposed on the replaceable module, and the base has the first perforated slot. The cover is disposed on the base, and the cover has the supporting portion disposed in the first direction. The supporting portion is propped against the replaceable module and has the opening slot. The opening direction of the opening slot faces towards the inner side of the support frame and is parallel to the second direction. The second direction is perpendicular to the first direction.

In an embodiment of the invention, the buckling member has the second perforated slot and the hooking portion. The hooking portion is disposed correspondingly to the opening slot, such that the hooking portion penetrates through the opening slot and is movably engaged with the support frame.

In view of the foregoing, in the embodiments of the invention, the locking module may be used to detachably hold the replaceable module such as the ODD in the support frame of the electronic device. In addition, the locking module may be disposed inside the concave space forming between the side surface of the main body portion of the shell and the top surface of the side portion. Thereby, in the embodiments of the invention, no additional space is required for the locking module when being disposed in the accommodating space, where the ODD is disposed therein, in the electronic device. As such, the locking module may be used commonly in different electronic devices, and the size and design of the accommodating space of the ODD are not required to be changed according to the locking module. Moreover, individual design and mold opening of holding mechanisms and buttons for different ODDs are no longer required by electronic devices, as such, assembly time of the ODDs and manufacturing costs of related engagement mechanisms are effectively reduced.

Furthermore, the locking module includes the handle part and the buckling member, and the buckling member may pivot relative to the body of the locking module, and that the structural interference is generated between the buckling member and the support frame. When the handle part moves in the removing direction, the handle part drives the buckling member to pivot relative to the body to release the structural interference between the buckling member and the support frame and further drives the locking module and the ODD to move out of the support frame. Therefore, in the embodiments of the invention, the ODD and the locking module thereof may achieve functions of unlocking and removing the ODD simply through motions of the handle part. Such function may replace the two or more buttons, e.g., the unlocking button and the removing button, on a conventional ODD. Design of the ODD and the holding mechanism thereof may further be simplified.

To make the above features and advantages of the invention more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 4A, FIG. 4B, and FIG. 4C are schematic flowcharts of motions of a locking module according to an embodiment of the invention.

DESCRIPTION OF THE EMBODIMENTS

Figure 1:
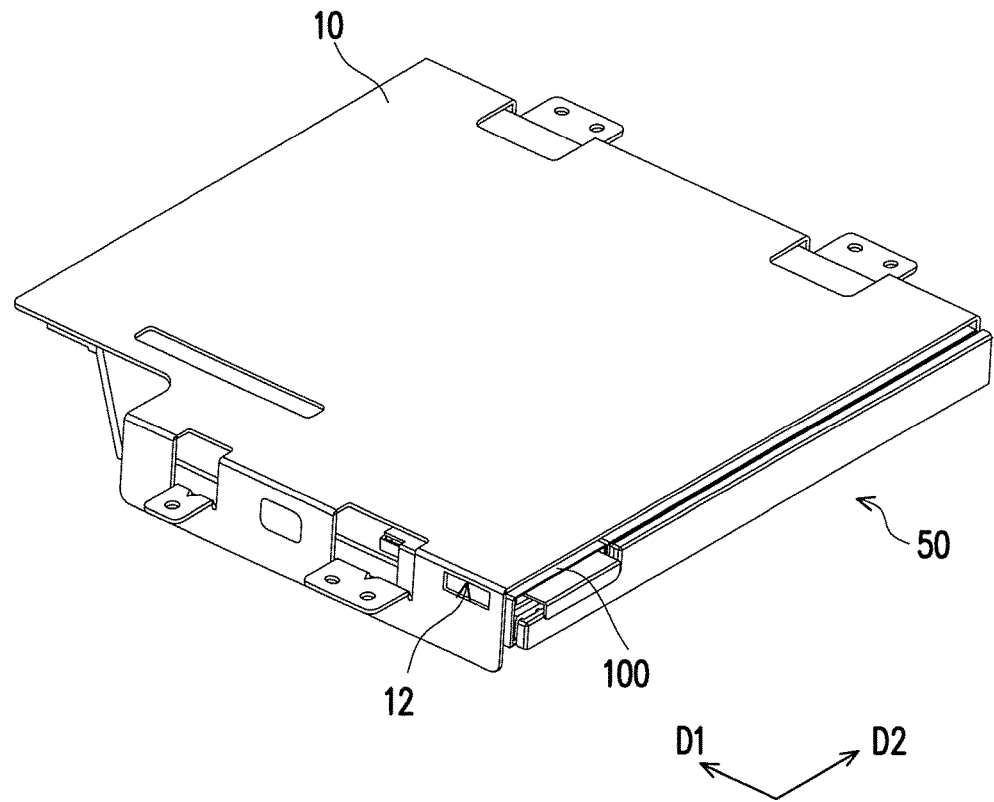
FIG. 1 is a schematic view of a replaceable module, a locking module, and a support frame according to an embodiment of the invention.
Figure 2:
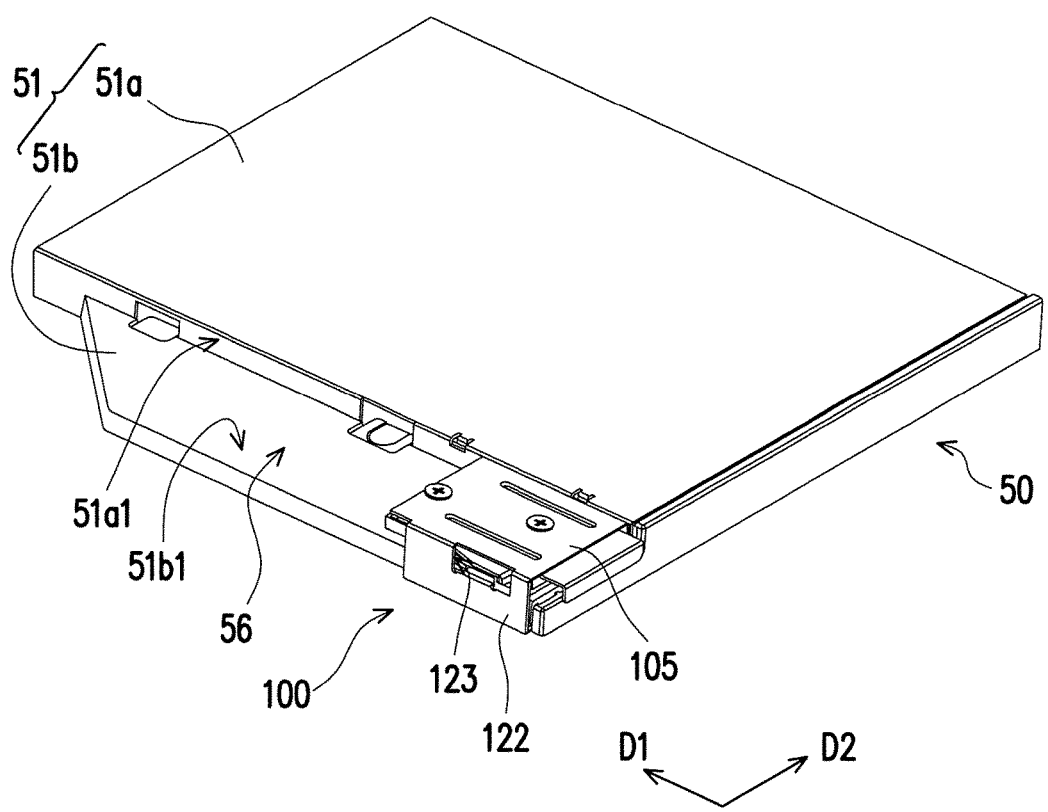
FIG. 2 is a schematic view of the locking module and the replaceable module in FIG. 1.
Figure 3A:
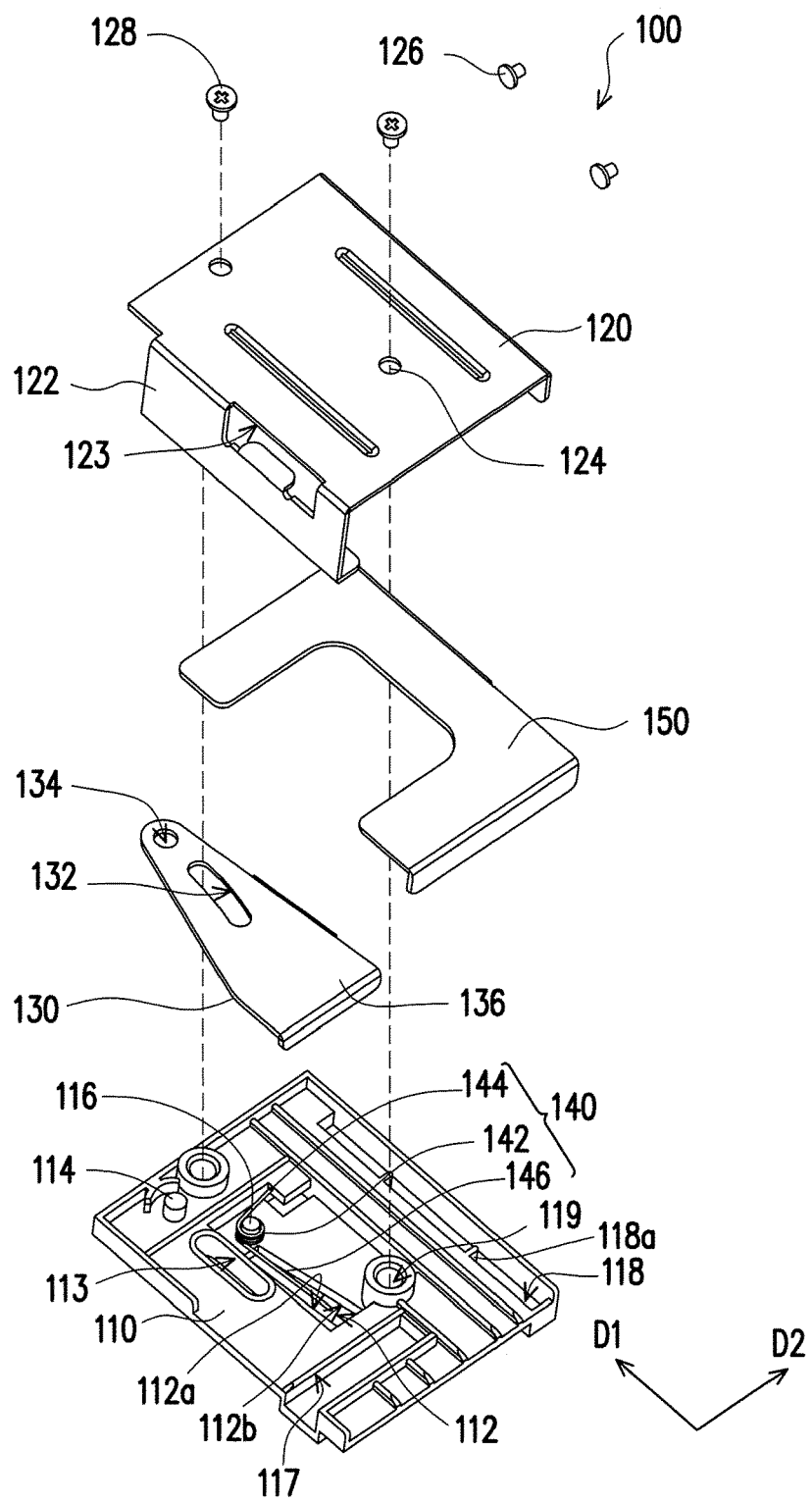
FIG. 3A is a schematic exploded view of the locking module in FIG. 1.

FIG. 1 is a schematic view of a replaceable module, a locking module, and a support frame according to an embodiment of the invention. FIG. 2 is a schematic view of the locking module and the replaceable module in FIG. 1. FIG. 3A is a schematic exploded view of the locking module in FIG. 1. Referring to FIG. 1, FIG. 2, and FIG. 3, in the embodiment, a replaceable module 50 may be held in an electronic device (not shown) such as a computer machine. In addition, the replaceable module 50 is, for example, an optical disk driver (ODD). An ODD 50 includes a shell 51 and a locking module 100. The shell 51 includes a main body portion 51a and a side portion 51b, and the side portion 51b is connected to the main body portion 51a. A concave space 56 with an L-shaped wall surface is formed between a side surface 51a1 of the main body portion 51a and a top surface 51b1 of the side portion 51b. The locking module 100 may be disposed inside the concave space 56. The ODD 50 may be detachably held on a support frame 10 through the locking module 100. In other embodiments provided by the invention (not shown), besides the ODD 50, the replaceable module 50 may also be a replaceable hard disk drive or other electronic modules. The invention is not limited thereto.

In the embodiment, the locking module 100 may be disposed inside the concave space 56 of the ODD 50, and a thickness of the locking module 100 is less than a height of the concave space 56. For instance, as shown in FIG. 2, a height of a top surface of the locking module 100 is lower than or substantially flush with a height of a top surface of the main body portion 51a of the ODD 50. Thereby, in the embodiment, the locking module 100 occupies no additional thickness space in an electronic device, such that, thin and light-weight design of the ODD 50 or the entire electronic device may not be affected. Besides, the ODD 50 itself includes the locking module 100 which may be commonly applied to the support frames 10 of different electronic devices. Therefore, individual buttons and holding mechanisms are not required to be designed for the ODDs 50 in different electronic devices with different appearances, and that costs of mold development and assembling are reduced.

As shown in FIG. 2 and FIG. 3A, the locking module 100 includes a body 105. The body 105 has a base 110 and a cover 120. In addition, the locking module 100 further includes a buckling member 130, an elastic member 140, and a handle part 150. In the embodiment, the base 110 has a first perforated slot 112 disposed in a first direction D1. The cover 120 is disposed on the base 110, and the cover 120 has a supporting portion 122 disposed on one of the lateral edges in the first direction D1. As shown in FIG. 2, the supporting portion 122 is propped against a side surface and a bottom of the side portion 51b. In addition, the supporting portion 122 has an opening slot 123, and an opening direction of the opening slot 123 is parallel to a second direction D2. The second direction D2 is perpendicular to the first direction D1.

Figure 3B:
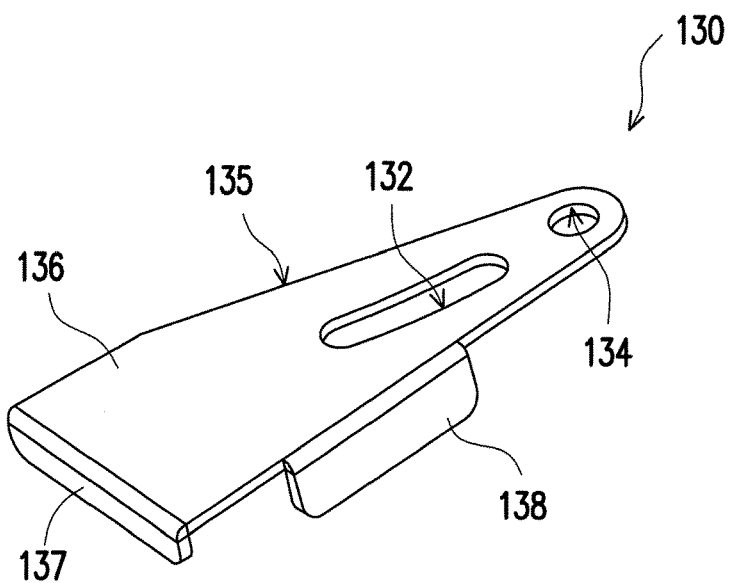
FIG. 3B is a schematic view of the buckling member of the locking module in FIG. 3A.

FIG. 3B is a schematic view of the buckling member of the locking module in FIG. 3A. Referring to FIG. 3A and FIG. 3B, the buckling member 130 is disposed between the base 110 and the handle part 150 and is pivoted onto the base 110. In the embodiment, the buckling member 130 has a second perforated slot 132 and a hooking portion 136. The hooking portion 136 may be disposed correspondingly to the opening slot 123 of the supporting portion 122, and the hooking portion 136 may penetrate through the opening slot 123 and movably generate a structural interference with the support frame 10. In addition, the base 110 has a groove 117 extending parallel to the second direction D2, and the hooking portion 136 has a first protruding rib 137 disposed at a lateral side thereof. When the buckling member 130 pivots relative to the base 110 and is retracted back into the base 110, the first protruding rib 137 of the hooking portion 136 may enter into the groove 117. The first protruding rib 137 may generate a structural interference with a side wall of the groove 117 after entering into the groove 117, such that the hooking portion 136 is limited to be located in the groove 117 of the base 110.

Referring again to FIG. 3A, the base 110 has a first pivot 114, and the buckling member 130 has a pivot hole 134. The first pivot 114 may be telescoped in the pivot hole 134, such that the buckling member 130 is pivoted to the base 110. As shown in FIG. 3B, the buckling member 130 has a second protruding portion 138 disposed on one side. The second protruding portion 138 extends in a direction perpendicular to the first protruding rib 137. In the embodiment, the second protruding portion 138 may be movably inserted into the first perforated slot 112 of the base 110 and leaned against a slot wall of the first perforated slot 112.

It is worth noting that, in the embodiment, the first perforated slot 112 of the base 110 may have a first slot wall 112a and a second slot wall 112b disposed opposite to each other. The first slot wall 112a and the second slot wall 112b are respectively inclined at an angle relative to the first direction D1, and thereby a sector-shaped space is formed in the first perforated slot 112. The second protruding portion 138 may move back and forth in the sector-shaped space in the first perforated slot 112. When the second protruding portion 138 moves from the first slot wall 112a to the second slot wall 112b, the entire buckling member 130 pivots relative to the base 110 along a counter-clockwise direction.

The elastic member 140 is pivoted onto the base 110 and is elastically propped against a side of the second protruding portion 138 of the buckling member 130. Specifically, the elastic member 140 is, for example, a torsional spring. The torsional spring has a spring body 142 and a first end 144 and a second end 146 connected thereto. In addition, the base 110 has a second pivot 116 disposed at a side of the first pivot 114. The spring body 142 is telescoped in the second pivot 116, and the first end 114 is fixed onto the base 110. The second end 146 may be pressed by the buckling member 130 and pivots relative to the first end 144.

As shown in FIG. 3A, the locking module 100 further includes a first screwing member 126. The first screwing member 126 may screw the locking module 100 onto the side surface 51a1 of the main body portion 51a along the second direction D2. Besides, the locking module 100 has a second screwing member 128 which may screw the cover 120 to a screw pillar 119 on the base 110 through a screw hole 124 on the cover 120.

Figure 3C:
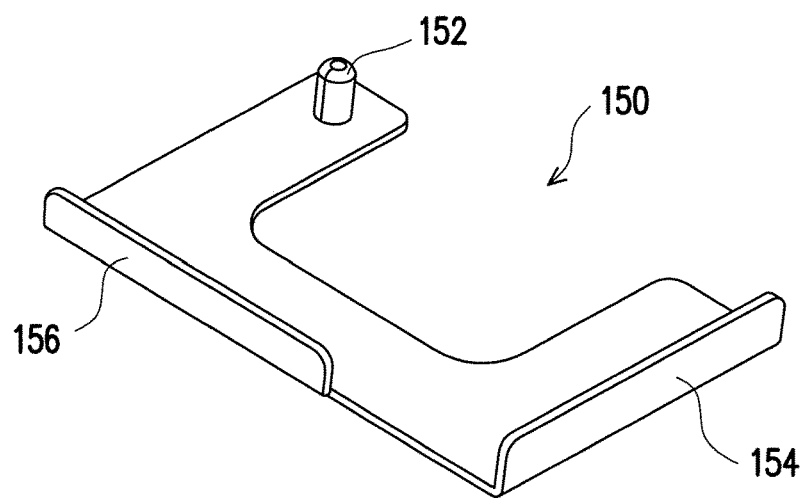
FIG. 3C is a schematic view of the handle part of the locking module in FIG. 3A.

FIG. 3C is a schematic view of the handle part of the locking module in FIG. 3A. Referring to FIG. 3A and FIG. 3C, the handle part 150 may be movably disposed between the cover 120 and the buckling member 130. In addition, the handle part 150 has a sliding axle 152. The sliding axle 152 is inserted into the second perforated slot 132 of the buckling member 130 and a third perforated slot 113 of the base 110. In the embodiment, the second perforated slot 132 is, for example, an arch-shaped perforated slot. The handle part 150 has a removing portion 154 disposed at a lateral side of the handle part 150 along the second direction D2. When a user intends to pull the handle part 150 out or push the handle part 150 in, the user may apply force to the removing portion 154 to drive the handle part 150 to move back and forth along the first direction D1. In addition, the handle part 150 has a first protruding portion 156 disposed on another lateral side of the handle part 150 along the first direction D1. As shown in FIG. 3A, the base 110 has a guiding rail 118 disposed along the first direction D1, and a side of the guiding rail 118 has a plurality of second protruding ribs 118a. In the embodiment, the first protruding portion 156 of the handle part 150 may be slidably disposed in the guiding rail 118, such that the first protruding portion 156 may move back and forth along the guiding rail 118 between a side wall of the base 110 and the second protruding ribs 118a. In the embodiment, a sliding direction of the first protruding portion 156 may be limited by the side wall of the base 110 and the second protruding ribs 118a, such that a moving direction of the handle part 150 relative to the base 110 may be limited in the first direction D1.

FIG. 4A, FIG. 4B, and FIG. 4C are schematic flowcharts of motions of a locking module according to an embodiment of the invention. Referring to FIG. 4A, FIG. 4B, and FIG. 4C, when the handle part 150 moves relative to the base 110 towards a direction of a thick arrow as shown in FIG. 4A, the sliding axle 152 may move towards the direction of the thick arrow along the third perforated slot 113 of the base 110. At the same time, the sliding axle 152 in the second perforated slot 132 slides from a top to an end of an arch-shaped slot way of the second perforated slot 132 to drive the buckling member 130 to pivot counter-clockwise around the first pivot 114 acting as the axle center.

In the embodiment, when the user applies force, the handle part 150 may be moved back and forth relative to the base 110 and the cover 120 in the first direction D1. As such, the ODD 50 is driven by the handle part 150 to be pulled out from the support frame 10 in the direction of the thick arrow or to be pushed back into the electronic device in the first direction D1, and that the ODD 50 may detachably be held in the support frame 10. As shown in FIG. 4A, before the handle part 150 is pulled out of the locking module 100 when the user applies force, an included angle θ1 is formed between the second end 146 and the first end 144 of the elastic member 140.

As shown in FIG. 4B, when the sliding axle 152 of the handle part 150 continues to slide along the third perforated slot 113 and the second perforated slot 132, the buckling member 130 may continue to be driven to pivot relative to the base 110 and press the second end 146 of the elastic member 140. Besides, the second protruding portion 138 of the buckling member 130 in the first perforated slot 112 moves towards the second slot wall 112b. When the second end 146 is pressed by the buckling member 130, the second end 146 may be compressed relative to the first end 144 and stores an elastic potential. Moreover, the included angle θ1 between the second end 146 and the first end 144 is reduced to θ2.

The handle part 150 may continue to be pulled out of the locking module 100 along the direction of the thick arrow in FIG. 4B, and the buckling member 130 may continue to pivot relative to the base 110 along a counter-clockwise direction. As shown in FIG. 4C, motions of the handle part 150 and the buckling member 130 may continue until the sliding axle 152 of the handle part 150 is leaned against an end of the second perforated slot 132 and the second protruding portion 138 of the buckling member 130 is leaned against the second slot wall 112b of the first perforated slot 112. Meanwhile, the buckling member 130 is unable to pivot further relative to the base 110, the sliding axle 152 of the handle part 150 is unable to continue to slide relative to the second perforated slot 132, and that the handle part 150 is unable to continue to move relative to the base 110 in the direction of the thick arrow. Moreover, a moving distance of the handle part 150 relative to its original position is dl, the second end 146 of the elastic member 140 is further compressed relative to the first end 144, and that the included angle θ2 therebetween is further reduced to θ3.

When the handle part 150 is pulled to the position as shown in FIG. 4C, the user may continue to apply force to the handle part 150 in the first direction D1 to drive the ODD 50 and the locking module 100 thereof to move together in the first direction D1 through the handle part 150. As such, the ODD 50 may be pulled out of the support frame 10 in a removing direction, i.e., the direction of the thick arrow, and that the ODD 50 may be replaced.

After the steps in FIG. 4A, FIG. 4B, and FIG. 4C are completed, the ODD 50 is pulled out from the support frame 10, and the user no longer applies force to the handle part 150, the elastic member 140 may be released in the above steps. Through the elastic potential energy stored when the second end 146 is compressed relative to the first end 144, the buckling member 130 is thus pushed by the second end 146 through an elastic restoring force and pivots relative to the base 110 back to an original position along a clockwise direction. At the same time, the buckling member 130 may drive the handle part 150 through the sliding axle 152 to move relative to the base 110 back to an original position in the first direction D1.

Figure 5A:
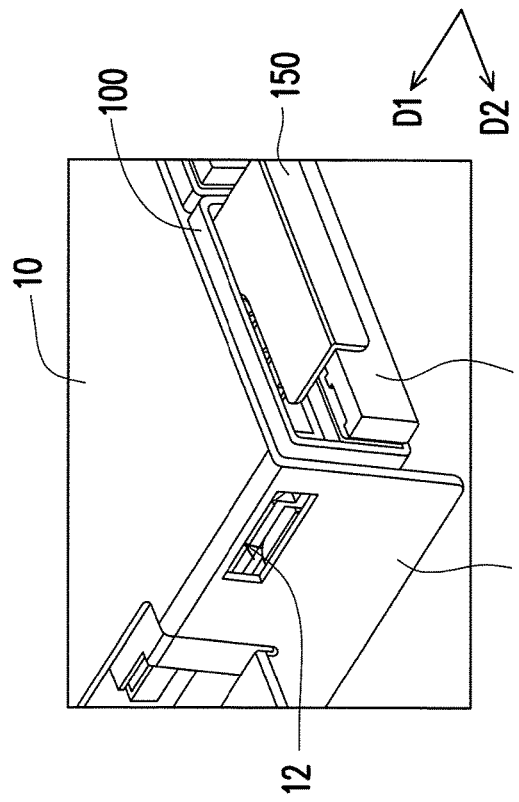
FIG. 5A, FIG. 5B, and FIG. 5C are schematic flowcharts illustrating steps of unlocking an optical disk drive (ODD), a locking module, and a support frame sequentially according to an embodiment of the invention.
Figure 5B:
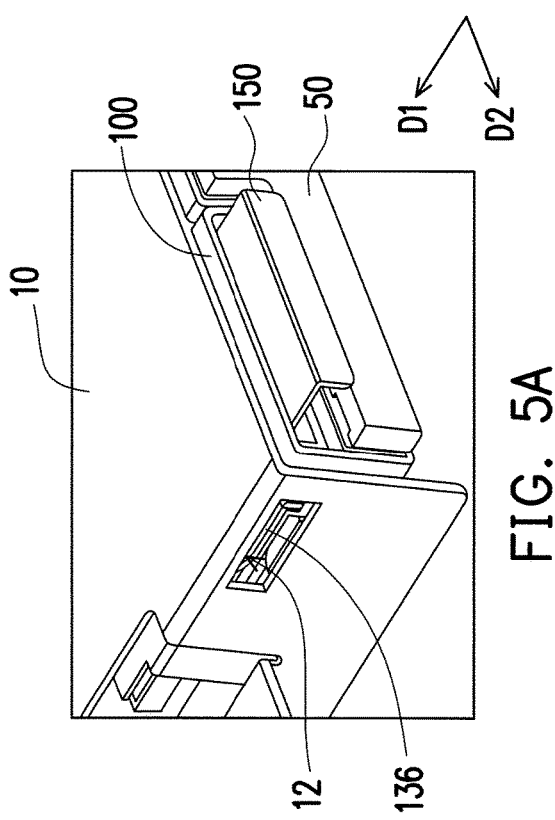
Figure 5C:
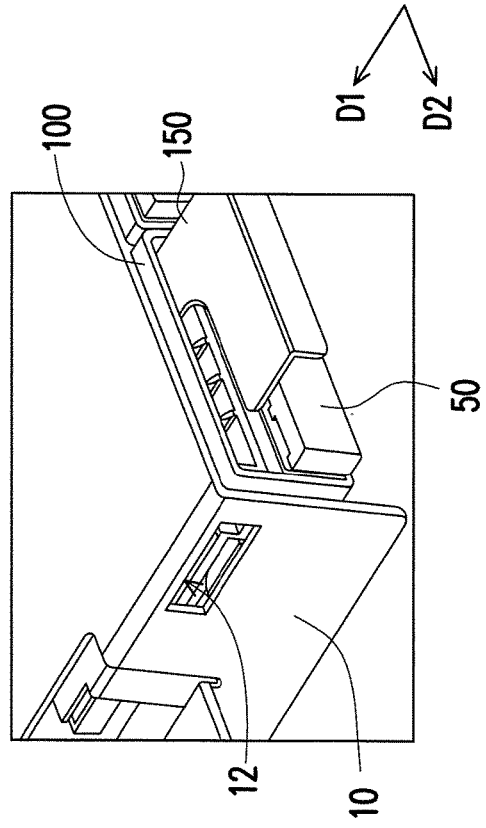

FIG. 5A, FIG. 5B, and FIG. 5C are schematic flowcharts illustrating steps of unlocking an ODD, a locking module, and a support frame sequentially according to an embodiment of the invention. Referring to FIG. 5A, before the handle part 150 of the locking module 100 is pulled out by applying force, the hooking portion 136 of the buckling member 130 may be engaged with a card slot 12 of the support frame 10 to hold the ODD 50 inside the electronic device.

In the embodiments of the invention, how the ODD 50 is engaged with the support frame 10 is not limited to above descriptions. In another embodiment (not shown), a plurality of protruding ribs may be disposed on an inner wall surface of the support frame 10. The protruding ribs may generate a structural interference with the buckling member 130 to hold the locking module 100 and the ODD 50 on the support frame 10.

Referring to FIG. 4B and FIG. 5B, when the handle part 150 is pulled out in the direction of the thick arrow in FIG. 4B, the handle part 150 may drive the buckling member 130 to pivot relative to the base 110 along a counter-clockwise direction. As such, the hooking portion 136 of the buckling member 130 is retracted back into the base 110, and that no structural interference is generated between the hooking portion 136 and the support frame 10. Thereby, the locking module 100 and the ODD 50 are no longer held on the support frame 10.

Referring to FIG. 4C and FIG. 5C, when the handle part 150 is pulled out to a position away from the original position at the distance of dl, and the buckling member 130 is unable to continue to pivot relative to the base 110, the user may continue to apply force to the handle part 150 in the direction of the thick arrow, such that the ODD 50 and the locking module 100 thereof located in the support frame 10 of the electronic device are pulled out all together.

Figure 6A:
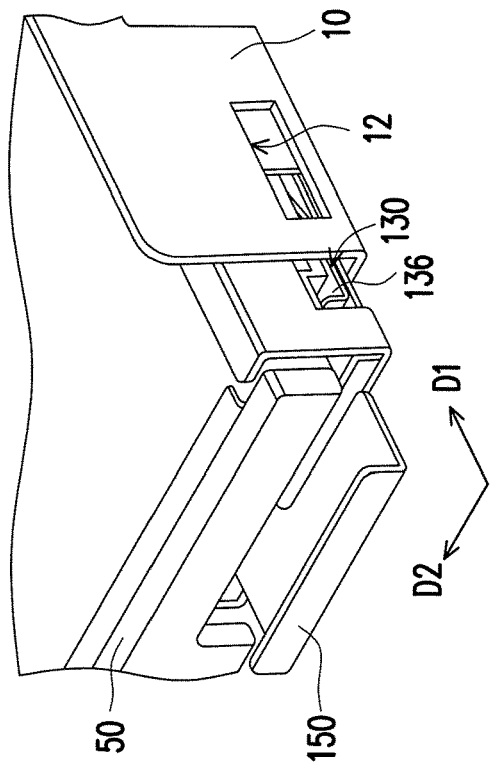
FIG. 6A, FIG. 6B, and FIG. 6C are schematic flowcharts illustrating steps of locking an ODD, a locking module, and a support frame sequentially according to an embodiment of the invention.
Figure 6B:
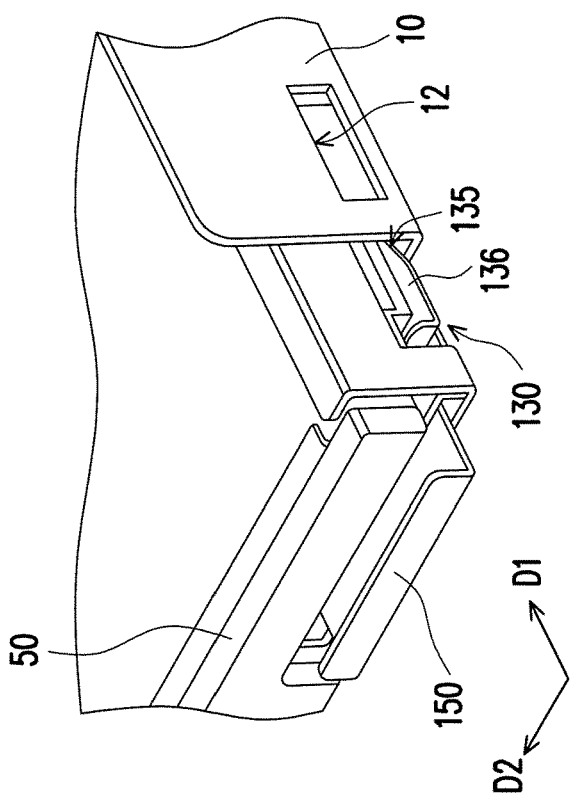
Figure 6C:
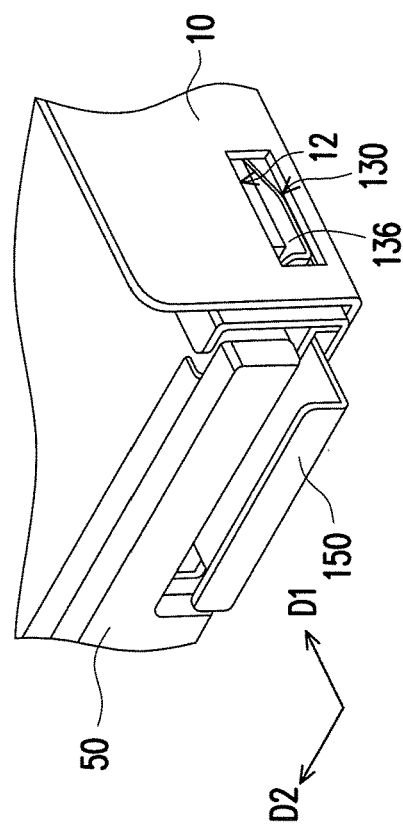

FIG. 6A, FIG. 6B, and FIG. 6C are schematic flowcharts illustrating steps of locking an ODD, a locking module, and a support frame sequentially according to an embodiment of the invention. Referring to FIG. 6A, in the embodiment, the buckling member 130 has a beveled edge 135. When the ODD 50 is inserted into the support frame 10, the beveled edge 135 of the buckling member 130 may be pressed by the inner wall of the support frame 10. As such, the buckling member 130 pivots relative to the base 110 and is retracted towards the base 110. Next, as shown in FIG. 6B, the hooking portion 136 of the buckling member 130 moves along an extending direction of a wall surface of the support frame 110, and a side of the hooking portion 136 continues to be leaned against the inner wall of the support frame 10.

As shown in FIG. 6C, when the locking module 100 and the ODD 50 are driven by the handle part 150 to be further pushed into the support frame 10 of a notebook computer in the first direction D1, the buckling member 130 is pushed to a position corresponding to the card slot 12 of the support frame 10. Meanwhile, the hooking portion 136 of the buckling member 130 may pivot relative to the base 110 through the elastic restoring force applied by the elastic member 140 and be pushed inside the card slot 12 in the second direction D2, and that the hooking portion 136 is engaged therein. In the embodiment, the ODD 50 and the locking module 100 locked thereon may be engaged back to the support frame 10 through the steps in FIG. 6A to FIG. 6C.

To sum up, in the embodiments of the invention, the ODD includes the locking module, such that the ODD may be held on the support frame of the electronic device through the locking module. In the embodiments of the invention, the locking module may be disposed inside the concave space of the ODD. Thereby, the locking module occupies no additional space in the electronic device and may be applied to electronic devices with different appearances, e.g., notebook computers. As such, additional mechanisms or buttons configured to hold the ODD are not required to be disposed in the electronic device. Therefore, numbers of designing steps and mold opening required for the holding mechanisms and the buttons of the ODDs in notebook computers with difference appearances may be effectively reduced. Moreover, problems such as uneven gaps between the buttons and the shells, unstable sliding of the buttons, stuck buttons, and noises that may occur easily during button assembly may also be prevented.

In addition, in the embodiments of the invention, the ODD may be held inside the support frame through the buckling member of the locking module. The structural interference between the buckling member and the support frame may be released driven by the handle part, such that the buckling member pivots relative to the base. Thereby, when the user intends to remove the ODD from the electronic device, the user may simply release the structural interference between the ODD and the support frame through applying force to the handle part to drive the ODD and the locking module to be pulled out together from the support frame. Therefore, no unlocking and removing buttons or mechanisms are required to be disposed individually on the ODD and the support frame. Furthermore, when the ODD is assembled or replaced, complexity of the work, time required, and labor costs may all be effectively reduced.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An optical disk drive (ODD), comprising:
a shell, comprising a main body portion and a side portion, the side portion being connected to the main body portion, wherein a concave space is formed between a side surface of the main body portion and a top surface of the side portion; and
a locking module, disposed inside the concave space, wherein the ODD is detachably held in a support frame of an electronic device through the locking module,
wherein the locking module comprises a base, a buckling member and a handle part, the base disposed on the side portion, the buckling member is pivoted to the base such that the buckling member is movably engaged with the support frame, the base has a first perforated slot, the buckling member has a second perforated slot, and the handle part has a sliding axle movably coupled into the second perforated slot and the handle part is adapted to move back and forth to drive the sliding axle to slide along the second perforated slot and to further drive the buckling member to pivot relative to the base, so as to release a structure interference between the buckling member and the support frame.

2. The ODD as claimed in claim 1, wherein a top surface of the locking module is lower than or substantially flush with a top surface of the main body portion.

3. The ODD as claimed in claim 1, wherein the locking module comprises a plurality of first screwing members, and the locking module being locked onto the side surface of the main body portion through the first screwing members.

4. The ODD as claimed in claim 1, wherein:
the base is disposed on the top surface of the side portion;
the locking module comprises:
a cover, disposed on the base, the cover having a supporting portion disposed along a first direction, wherein the supporting portion is propped against the side portion and has an opening slot, an opening direction of the opening slot faces towards an inner side of the support frame and is parallel to a second direction, and the second direction is perpendicular to the first direction;
the buckling member is disposed between the base and the cover and has a hooking portion, and the hooking portion is disposed correspondingly to the opening slot, such that the hooking portion penetrates through the opening slot and is movably engaged with the support frame; and
the handle part is movably disposed between the cover and the buckling member, wherein the handle part is adapted to move back and forth relative to the base and the cover along the first direction to drive the sliding axle to slide along the second perforated slot.

5. The ODD as claimed in claim 4, wherein the locking module further comprises an elastic member pivoted onto the base and propped against a side of the buckling member.

6. The ODD as claimed in claim 5, wherein the elastic member is a torsional spring and has a spring body and a first end and a second end connected to the spring body, the spring body is pivoted to the base, and the first end is fixed onto the base.

7. The ODD as claimed in claim 4, wherein the locking module further comprises a plurality of second screwing members, and the cover is locked onto the base through the second screwing members.

8. The ODD as claimed in claim 4, wherein the support frame has a card slot disposed correspondingly to the opening slot of the supporting portion, an opening direction of the card slot is parallel to the second direction, and the hooking portion is adapted to be engaged into the card slot through the opening slot.

9. The ODD as claimed in claim 4, wherein the handle part has a removing portion disposed on a lateral side of the handle part along the second direction.

10. The ODD as claimed in claim 4, wherein the base has a guiding rail disposed along the first direction, the handle part has a first protruding portion disposed along the first direction, and the first protruding portion is adapted to slide back and forth along the guiding rail.

11. The ODD as claimed in claim 10, wherein the buckling member has a second protruding portion, and the second protruding portion is movably inserted into the first perforated slot.

12. The ODD as claimed in claim 4, wherein the first perforated slot has a first slot wall and a second slot wall disposed opposite to each other, and the first slot wall and the second slot wall are respectively inclined in the first direction.

13. The ODD as claimed in claim 4, wherein the second perforated slot is an arch-shaped slot.

14. A locking module, adapted to detachably hold a replaceable module in a support frame of an electronic device or remove the replaceable module out of the support frame along a removing direction and comprising:
a body, disposed on the replaceable module;
a buckling member, pivoted on the body and movably generating a structural interference with the support frame; and
a handle part;
wherein the body comprises a base being disposed on the replaceable module, the base has a first perforated slot, the buckling member has a second perforated slot, and the handle part has a sliding axle movably coupled into the second perforated slot and the handle part is adapted to move back and forth in the removing direction to drive the sliding axle to slide along the second perforated slot and to further drive the buckling member to pivot relative to the body to release the structural interference between the buckling member and the support frame.

15. The locking module as claimed in claim 14, further comprising a plurality of first screwing members, the locking module being locked onto the replaceable module through the first screwing members.

16. The locking module as claimed in claim 14, wherein when the structural interference between the buckling member and the support frame is released, the handle part is adapted to drive the locking module and the replaceable module to move out of the support frame along the removing direction, and the replaceable module comprises an ODD.

17. The locking module as claimed in claim 14, wherein the body comprises:
a cover, disposed on the base, the cover having a supporting portion disposed along a first direction, wherein the supporting portion is propped against the replaceable module and has an opening slot, an opening direction of the opening slot faces towards an inner side of the support frame and is parallel to a second direction, and the second direction is perpendicular to the first direction.

18. The locking module as claimed in claim 17, wherein the buckling member has a hooking portion, and the hooking portion is disposed correspondingly to the opening slot, such that the hooking portion penetrates through the opening slot and is movably engaged with the support frame.

19. The locking module as claimed in claim 18, wherein the second perforated slot is an arch-shaped slot.

20. The locking module as claimed in claim 18, wherein the support frame has a card slot disposed correspondingly to the opening slot of the supporting portion, an opening direction of the card slot is parallel to the second direction, and the hooking portion is adapted to be engaged in the card slot through the opening slot.

21. The locking module as claimed in claim 17, further comprising an elastic member, pivoted onto the base and propped against a side of the buckling member.

22. The locking module as claimed in claim 21, wherein the elastic member is a torsional spring and has a spring body and a first end and a second end connected to the spring body, the spring body is pivoted to the base, and the first end is fixed onto the base.

23. The locking module as claimed in claim 17, further comprising a plurality of second screwing members, the cover being locked onto the base through the second screwing members.

24. The locking module as claimed in claim 17, wherein the handle part has a removing portion disposed on a lateral side of the handle part along the second direction.

25. The locking module as claimed in claim 17, wherein the base has a guiding rail disposed along the first direction, the handle part has a first protruding portion disposed along the first direction, and the first protruding portion is adapted to slide back and forth along the guiding rail.

26. The locking module as claimed in claim 17, wherein the buckling member has a second protruding portion, and the second protruding portion is movably inserted into the first perforated slot.

27. The locking module as claimed in claim 17, wherein the first perforated slot has a first slot wall and a second slot wall disposed opposite to each other, and the first slot wall and the second slot wall are respectively inclined in the first direction.

* * * * *